(12) United States Patent
Gabler et al.

(10) Patent No.: US 6,417,783 B1
(45) Date of Patent: Jul. 9, 2002

(54) MOTOR VEHICLE DETECTOR

(75) Inventors: Manfred Gabler, München (DE); Walter Kuster, Tuggen (CH); Elmar Reisinger, Weichs; Erik Büchel, Leutenbach, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/367,064

(22) PCT Filed: Feb. 3, 1998

(86) PCT No.: PCT/DE98/00294

§ 371 (c)(1),
(2), (4) Date: Aug. 5, 1999

(87) PCT Pub. No.: WO98/35330

PCT Pub. Date: Aug. 13, 1998

(30) Foreign Application Priority Data

Feb. 5, 1997 (DE) ..................... 297 01 998 U
May 27, 1997 (DE) ..................... 297 09 286 U
Jun. 19, 1997 (DE) ..................... 297 10 738 U

(51) Int. Cl.⁷ ................................. G08G 1/01
(52) U.S. Cl. ............... 340/933; 340/934; 340/935; 340/936; 340/937; 340/941; 340/942; 340/943
(58) Field of Search ................ 340/933–937, 340/941–943

(56) References Cited

U.S. PATENT DOCUMENTS

| | | | | |
|---|---|---|---|---|
| 3,268,863 A | * | 8/1966 | Odion et al. | 340/34 |
| 4,785,295 A | * | 11/1988 | Fukui et al. | 340/679 |
| 4,985,705 A | * | 1/1991 | Stammler | 342/69 |
| 5,066,950 A | * | 11/1991 | Schweitzer et al. | 340/937 |
| 5,463,373 A | * | 10/1995 | Widl et al. | 340/441 |
| 5,528,234 A | * | 6/1996 | Mani | 340/933 |
| 5,530,441 A | * | 6/1996 | Takatou et al. | 340/937 |
| 5,530,446 A | * | 6/1996 | Filipek | 342/13 |
| 5,554,984 A | * | 9/1996 | Shigenaga et al. | 340/937 |
| 5,581,249 A | * | 12/1996 | Yoshida | 340/928 |
| 5,705,996 A | * | 1/1998 | Eguchi et al. | 340/928 |
| 5,717,390 A | * | 2/1998 | Hasselbring | 340/933 |

FOREIGN PATENT DOCUMENTS

| | | |
|---|---|---|
| DE | 41 02 381 A1 * | 7/1992 |
| DE | 41 07 803 A1 | 9/1992 |
| FR | 2 697 364 | 4/1994 |
| HU | 212 140 B | 5/1994 |
| WO | WO 90/05969 | 5/1990 |

* cited by examiner

*Primary Examiner*—Julie Lieu
(74) *Attorney, Agent, or Firm*—Harness, Dickey & Pierce P.L.C.

(57) ABSTRACT

Vehicle detector arrangement comprising at least one detector unit (8) comprising at least one sensor (47, 48, 49, 50), a transmission/reception unit (54), an energy supply unit and a control unit (51, 52, 53), whereby the energy supply unit comprises a solar cell module (3). The transmission/reception unit (54), the energy supply unit and the control unit (51, 52, 53) are accommodated in a housing (27, 28) and connected to the at least one detector unit (8), whereby the solar cell module (3) is secured to the outside of the housing (27, 28). As a result of what is thus autonomous functioning of the vehicle detector arrangement, it can be simply secured, for example, to a bridge (6), and complicated installation jobs for power supply and data transmission, for example to a traffic routing center, are avoided.

31 Claims, 12 Drawing Sheets

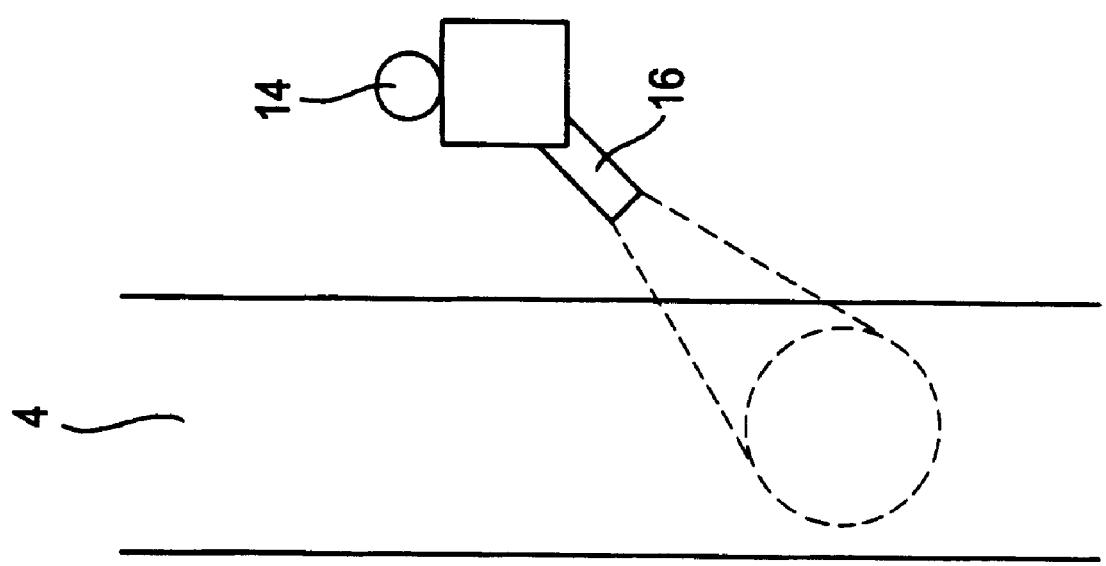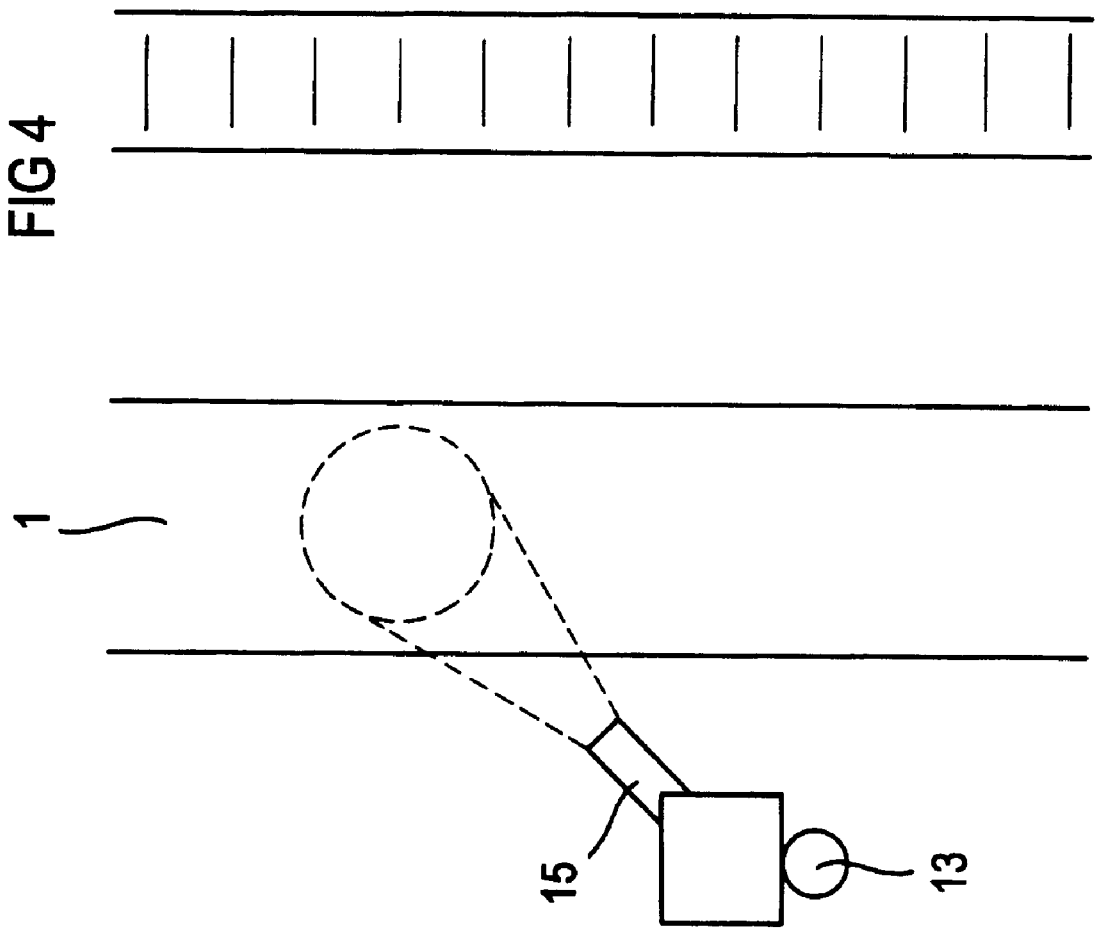

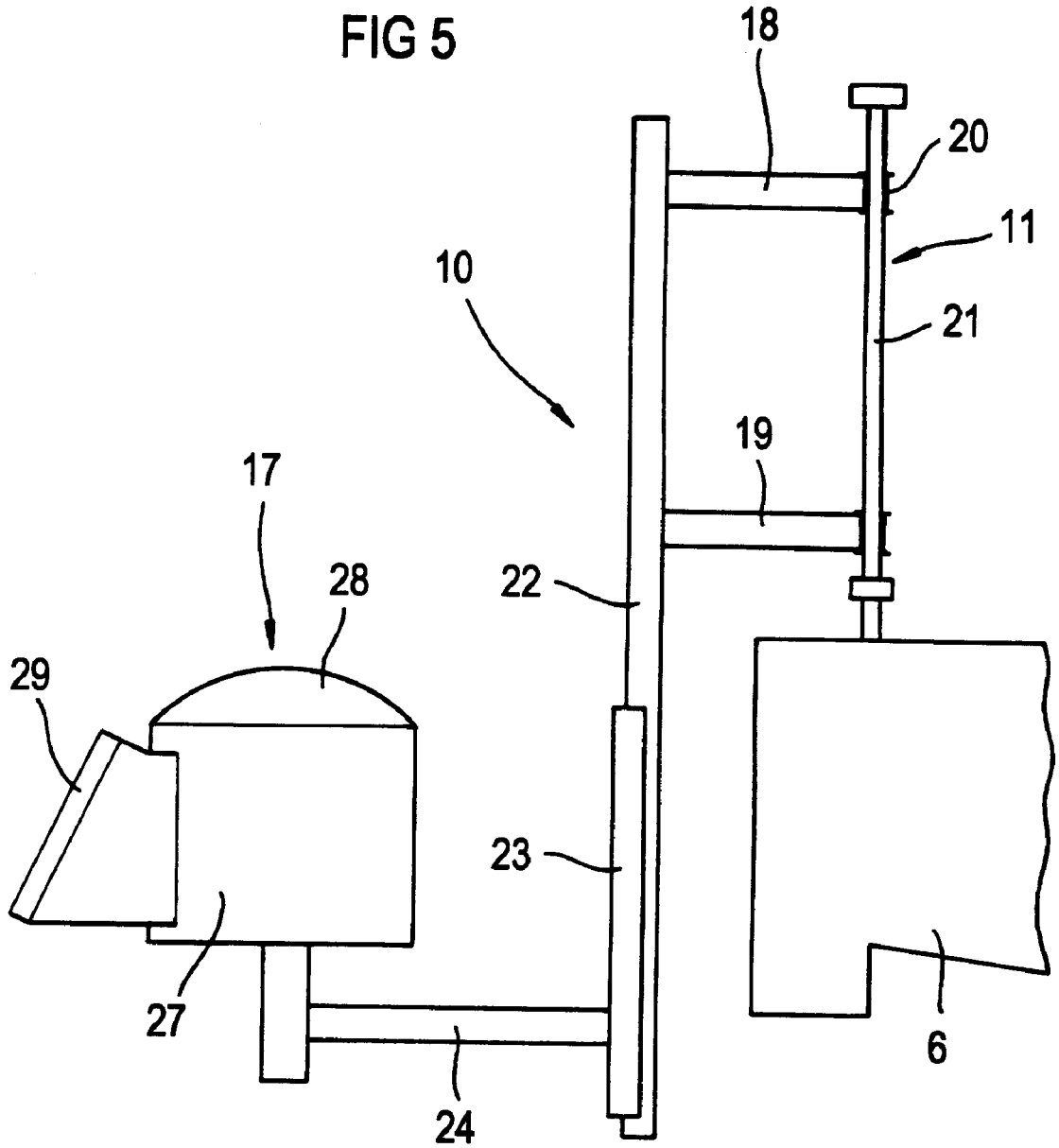

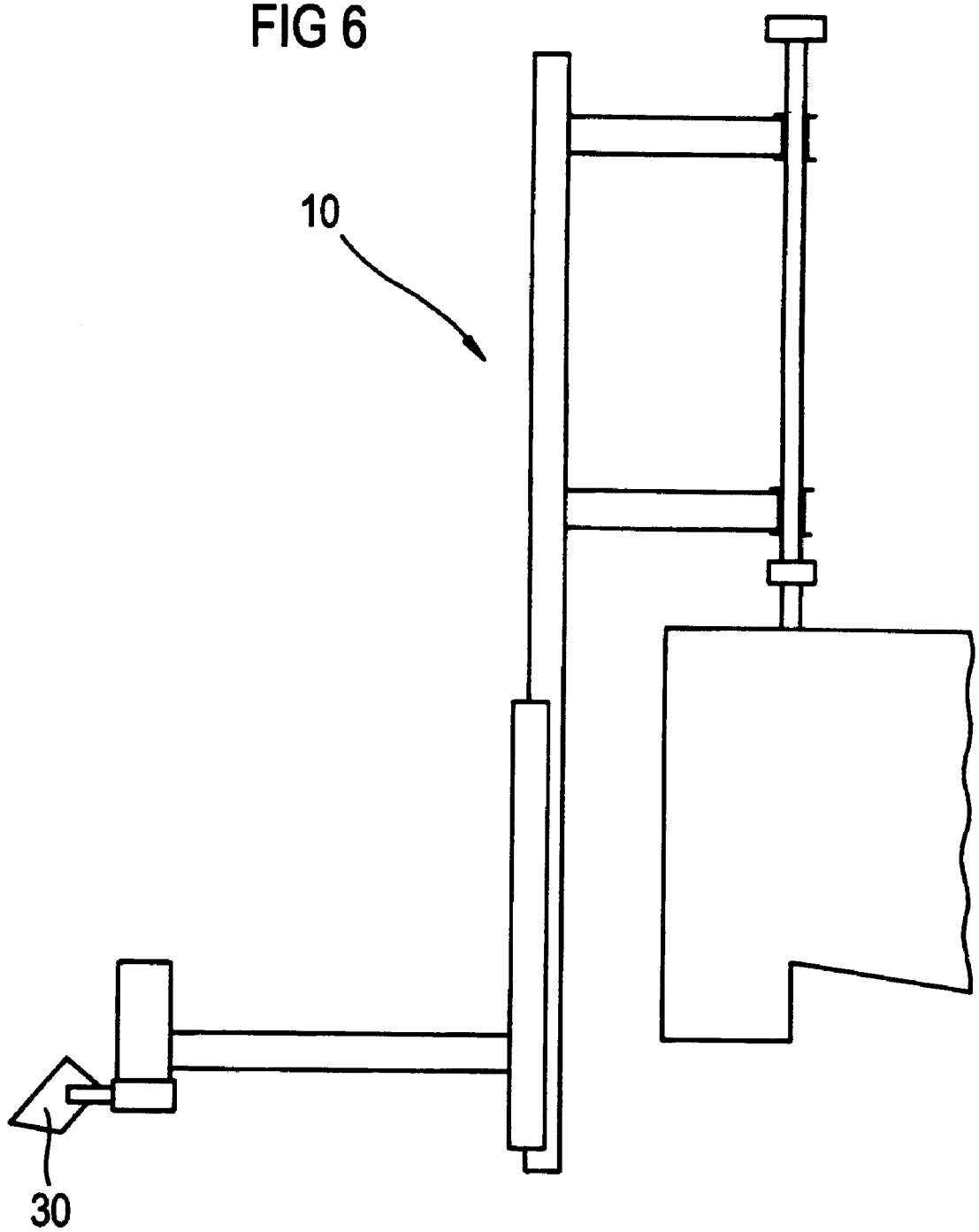

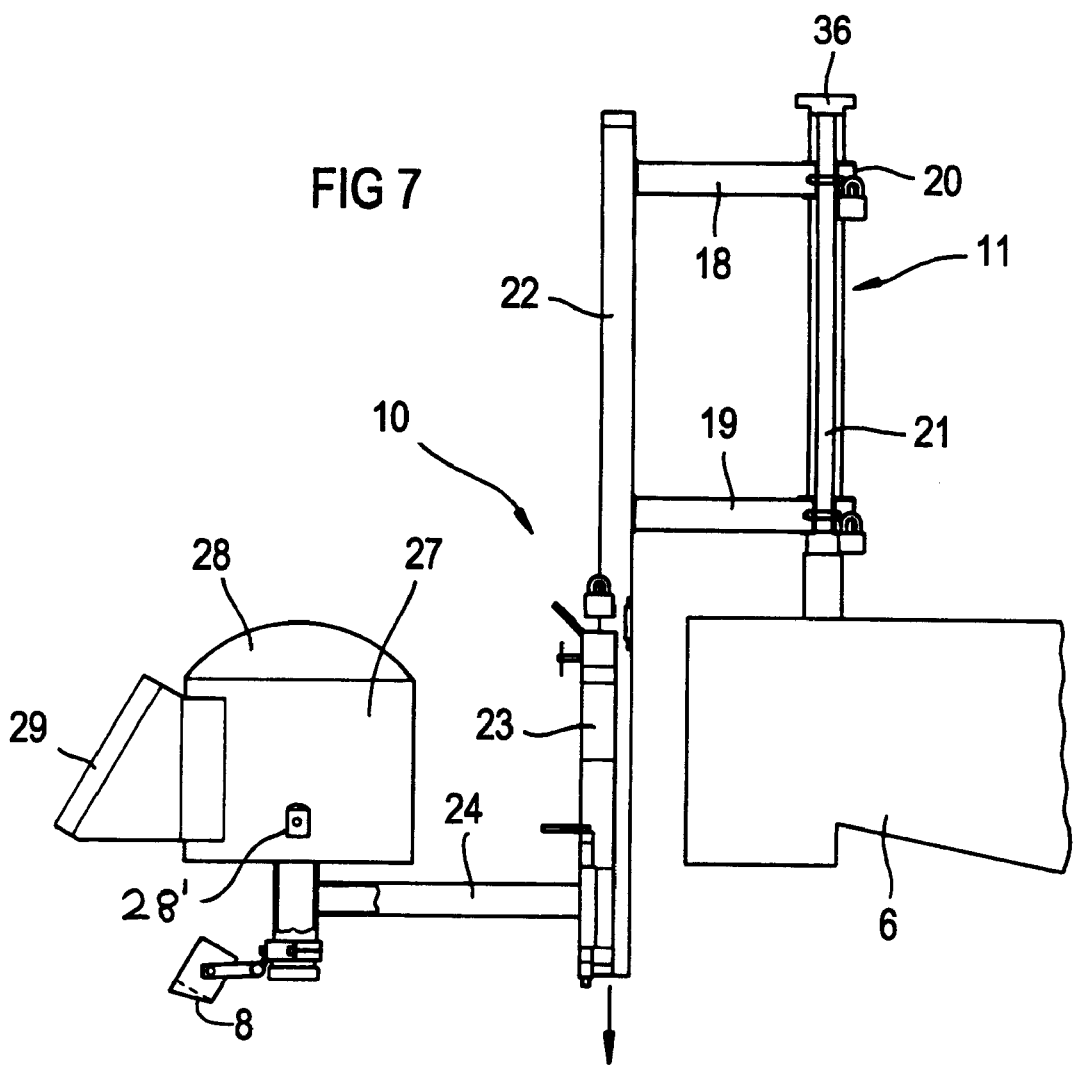
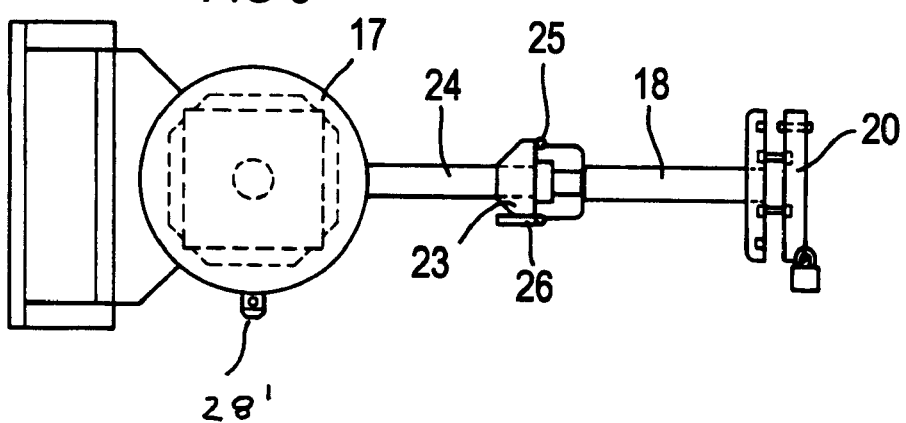

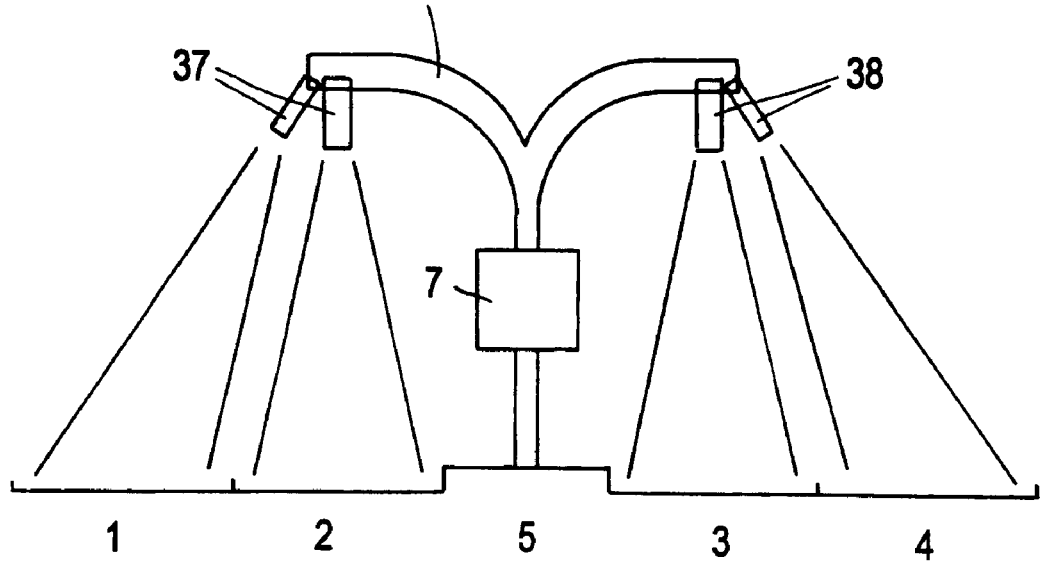
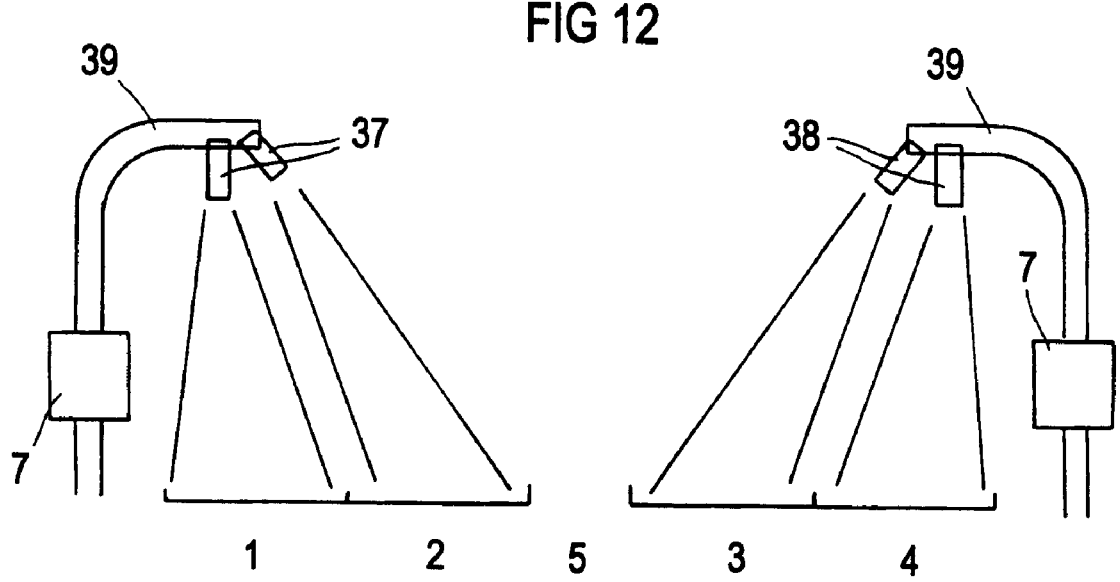

MOTOR VEHICLE DETECTOR

BACKGROUND OF THE INVENTION

1. Field of the Invention

The present invention is directed to a vehicle detector arrangement including a sensor with a solar power supply.

2. Description of the Related Art

Vehicle detection, for example for determining speeds, for counting vehicles or for classification, among other things for traffic routing and traffic information systems, is becoming more and more necessary and desirable due to the increasing traffic density. A means for identifying vehicles is disclosed, for example, by German Patent Document DE 27 54 117 C2, whereby it is required that the vehicles be equipped with a reply module that is evaluated at specific read locations arranged in the roadway area. Both the equipping of vehicles with readable reply units as well as the arrangement of read stations in the roadway area are relatively complicated and cost-intensive.

SUMMARY OF THE INVENTION

The present invention is based on the object of proving a vehicle detector arrangement for practical everyday use. The inventive vehicle detector arrangement should be capable of acquiring a continuous and durable data base and make it available for evaluation in order to enable dependable traffic information and a traffic routing adapted to the increasing traffic density without having to be connected to an external power supply and to data transmission cables in a complicated way.

For typically achieving the object, the invention proposes that the transmission/reception unit, the energy supply unit and the control unit are accommodated in a housing and are connected to the at least one detector unit, whereby at least one solar cell module is arranged at the outside of the housing.

The inventive vehicle detector arrangement is a compact central unit that can be flexibly utilized, whereby the elements that can be combined for one or more detector elements are accommodated in a housing of, for example, plastic. Such a central unit can be arranged with a supporting structure at buildings, bridges and the like but can also be secured to carrier poles and the like. Due to the energy supply with a solar cell module and the transmission/reception means, the vehicle detector arrangement thus works autonomously and no complicated installation jobs are needed. The connection between the central unit and the at least one detector unit can likewise be mechanically produced with a carrier unit. Detector units can also be positioned completely separately from the housing and can be electrically connected to the central unit.

According to one proposal of the invention, the detector unit—one or more being provided—comprises at least one passive of infrared sensor. Advantageously, the electrical circuit can be such due to the employment of the passive infrared detector that only a minimal power consumption ensues. The at least one sensor element can be arranged in a separate housing, for example a cylindrical housing with a frontal lens cover. According to an especially advantageous proposal of the invention, a detector unit comprises a plurality of sensors, whereby sensors with post-pulse oscillation and sensors without post-pulse oscillation are combined. Advantageously, three sensors with post-pulse oscillation are combined with one sensor without post-pulse oscillation.

According to another advantageous proposal of the invention, the detector unit additionally or alternatively comprises radar sensors or, respectively, additionally or alternatively comprises microwave sensors. A further improvement of the acquisition properties is achieved by the inventive combination of sensors with post-pulse oscillation and without post-pulse oscillation or, respectively, by the use of different sensors.

From the point of view of optimum energy utilization, the invention proposes that the vehicle detector arrangement can be switched between an idle mode and an active mode. This switching ensues automatically, for example after acquisition of a specific minimum number of vehicles, after expiration of an acquisition-free time or the like.

It is advantageously proposed that the solar cell module is adjustable.

Since, in particular, a readjustment of the angle of inclination considerably improves the utilization of solar light, an automatic readjustment of the solar cell module can also be inventively provided.

A critical aspect of the inventive vehicle detector arrangement is an altogether beneficial current balance. A battery and a solar panel are respectively connected to a charge regulator. The battery and charge regulator are designed for a nominal 12 volts. The solar panel, for example, delivers 5 through 6 watts. The charge regulator is connected to a voltage converter that nominally supplies the following detector circuit with 6 volts. Such a circuit enables a power consumption of approximately 4.75 mA at 12 volts. The current balance exhibits a power consumption of a maximum of 36 mW for a detector unit. The dissipated power of the voltage converter lies at approximately 20%, i.e. approximately 9 mW. The charge regulator has an intrinsic consumption that lies at approximately 12 mW. It follows from the data that a buffer battery of only 6.6 Ah can guarantee operation for more than 40 days without current being supplied from the solar panel. The inventive vehicle detector arrangement thus works nearly autonomously and extremely imperceptibly due to the structure. One reason for this is in the PIR technology that is employed, this making use of long-wave infrared radiation that already exists and that every body emits above the absolute zero point (−273° C.).Differing from other technologies, thus, energy need not be emitted and in turn received. Only already existing, natural radiation is received. Radiation contrasts are thereby identified, namely both positive as well as negative contrasts. The ambient temperature thus plays a negligible part because the thermal overall change in radiation is acquired, as a result whereof the detection is nearly independent of the radiation frequency or, respectively, of the wavelength. The radiation contrast, among other things, is a function of the size and of the emission factor of the surface of a vehicle moving in or through the acquisition area. For achieving adequately precise measured values, a wait is first carried out for a temporally stable measured value sequence before the actual measurement.

The principle of a detector unit for achieving the stated objective is based on the detection of a vehicle that moves in a travel direction through a plurality of spatially separate zones that form the acquisition region. These at least two zones derive due to the optical imaging of corresponding sensor elements with a suitable lens arrangement and the evaluation of the resulting sensor signals. The speed information can be acquired from the time that a vehicle requires in order to proceed from zone 1 to zone 2. The vehicle length is calculated from the identified speed and the dwell time of a vehicle in one of the zones. Advantageously, more than the acquired two zones are selected and sensors having post-pulse oscillation as well as sensors without post-pulse oscillation are utilized and the signals resulting therefrom are interpreted in order to be nonetheless able to output information to the control unit given deterioration of a detector function or even given outage of a sensor (thereby providing a redundancy of the measurement).

The intensity and time sequence of the radiation changes produced in this way can vary greatly due to weather conditions over the course of a day and of the year as well as depending on the traffic flow. The amplitudes and time sequences of the signals of each sensor element resulting therefrom are continuously identified and further-processed for control purposes. This control, for example, can influence the properties of the gain of the sensor signals or the response thresholds of the signal processing and is especially advantageous because both the amplifiers as well as the signal evaluation thereby work in an optimum range under all weather conditions and traffic situations and the detector unit supplies extremely reliable results.

The physical principle of the detection on the basis of the change in thermal emission is also especially beneficial because it allows detector units to be realized with an essentially extremely low power consumption given autonomous, solar-operated supply.

The same physical principle also allows detector units to be mounted to the side of the lane, so that the coverage area is directed onto the lane to be monitored obliquely from above. This situation is especially advantageous when no bridge structure is available for mounting the detector units.

Due to the selection and arrangement of the infrared sensors as well as of the following amplification and signal evaluation, vehicles that stand still in the coverage area over a longer time can also be detected in addition to moving vehicles in order, in particular, to have information about the traffic available in traffic jam situations as well.

The signal evaluation is also in the position to monitor the correct function of the detector unit and its individual component parts as well as to monitor the correct alignment of the detector unit with reference to the lane to be monitored and to output an appropriately encoded message to the control unit given the presence of a malfunction. On the basis of corresponding circuits, idle modes can, over and above this, be set, so that, for example, an information forwarding via the transmission/reception unit, particularly the radio modem, only ensues on the basis of specific parameters identified by the control unit. For example, transmission conditions can thus be set by program. The transmissions thereby ensue, for example, via the SMS (short message system) band of a mobile radio telephone network, proceeding to a traffic routing center.

Advantageously, the detector means comprises one detector per lane of the roadway surface to be monitored, this being arranged above the level of the roadway surface and traffic movement on the lane allocated to it being capable of being acquired therewith. As a result of the fact that each lane has a detector allocated to it, the exact acquisition of all of the traffic occurring on the roadway surface is possible, since each lane is designed for only one vehicle in terms of its width. Vehicles traveling simultaneously through a specific area of the roadway surface can thus also be individually acquired. Due to the arrangement of the detectors above the level of the roadway surface, the traffic occurring on each lane can be acquired disturbance-free. Reliable data in view of the traffic density can be acquired with a vehicle detector arrangement fashioned in this way, these data being advantageously utilized in the framework of a parking routing system or of a traffic jam monitoring system or the like.

It is possible to fashion the processing means of the inventive vehicle detector arrangement as a central unit to which all detectors of the vehicle detector arrangement are connected with a suitable cabling. As a result thereof, the outlay for processing and forwarding the data acquired by the detectors of the vehicle detector arrangement is considerably reduced.

The central unit can also be advantageously arranged above the level of the roadway surface. For protecting the central unit against vandalism or the like, it is advantageous to arrange this in a cylindrical metal container, particularly a steel container, that is closed at one side with a plastic dome. The risk of vandalism or the like is thus largely precluded in conjunction with the arrangement of the central unit above the level of the roadway surface.

The plastic dome can be advantageously fashioned of polyamide or polyester, whereby these plastics, on the one hand, exhibit the required mechanical strength but, on the other hand, are transmissive for radio waves or the like, so that an antenna of the central unit can be expediently arranged in the region of the plastic dome.

Given employment at a bridge structure, the detectors and the central unit can be respectively attached to a frame that can be attached at the outside of a bridge structure to a side rail. As a result thereof, the outlay for the mounting, repair and maintenance of the vehicle detector arrangement can be considerably reduced since the bridge structure is available as a work surface.

In order, given mounting, repair and maintenance jobs at the inventive vehicle detector arrangement, to reduce the risk that articles will fall from the vehicle detector arrangement onto the roadway surface, each frame of the inventive vehicle detector arrangement advantageously comprises a pivotable section that can be pivoted from a position arranged outside the side rail into a position arranged above the bridge structure. Significant portions of the mounting, repair and maintenance jobs can be implemented inside the side rail of the bridge structure, so that one can reliably prevent any articles from falling down onto the roadway surface or, respectively, onto the lane under the bridge structure. After the conclusion of the majority of the mounting jobs, the pivotable section of the frame must then merely be pivoted from its position arranged above the bridge structure into its position arranged outside the side rail and can then be subsequently brought to its ultimate installation position or secured thereat.

A firm attachment of the vehicle detector arrangement or, respectively, of the frame above the roadway surface at the bridge structure can be achieved when the frame is positively connected to the side rail over at least three web members of the side rail, whereby the frame should be advantageously connected to the side rail at two locations over the at least three web members of the side rail.

For correct positioning and for a fixed attachment, the frame should comprise two horizontal fastening arms projecting outside the side rail that are respectively firmly connected to the side rail at one end. As a result thereof, an attachment of the function unit can be achieved wherein this is arranged at the frame over the roadway surface without interposition of the bridge structure.

In an advantageous development, the frame comprises a vertical carrying rail that is secured to the ends of the two horizontal fastening arms that are spaced from the side rail.

Insofar as the frame has a carriage that is displaceable in a vertical direction at the carrying rail, it is possible to position the detectors and the central unit of the inventive vehicle detector arrangement at a side of the bridge structure in an arbitrary vertical position within a certain range, as a result whereof the accessibility of the vehicle detector arrangement for unauthorized persons can be considerably limited. Vandalism and other intentional damage, in particular, can thereby be precluded to the greatest possible extent.

The pivotable section of the frame can be expediently fashioned as swivel arm that has its one end pivotably and fixedly seated at the carriage and carries the detectors or, respectively, the central unit of the vehicle detector arrangement at its other end. As a result of such a fashioning, both a pivotable arrangement of the detectors or, respectively, of the central unit of the vehicle detector arrangement as well as an adjustable positioning thereof in a vertical direction can be realized in what is a comparatively uncomplicated way in technical-structural terms. Due to the pivotable arrangement, jobs arising during mounting or during maintenance can also be undertaken above the bridge structure, i.e. thus, over the bridge structure, which, on the one hand, reduces the risk to the assembly or, respectively, maintenance personnel and, on the other hand, substantially reduces the risk to traffic participants using the roadway surface below the bridge structure due to falling articles.

The vertical adjustment of the carriage seated which is displaceable in a vertical direction at the carrying rail of the frame can be implemented in a simple way with a lifting mechanism that can be plugged onto the vertical carrying rail and comprises a cable winch whose cable can be connected to the carriage and with which the carriage can be vertically moved until the pivot arm of the frame is arranged above an upper string piece of the side rail of the bridge structure. For potential mounting, maintenance or repair jobs at the central unit or at the detectors of the vehicle detector arrangement, the pivot arm can then be lifted with the lifting mechanism until it can be swiveled from its position arranged on the other side of the bridge structure above the roadway surface into its position arranged above the bridge structure. After this, the pivot arm can then be lowered with the lifting mechanism or, respectively, by paying out the cable winch thereof until it lies on the upper string piece of the side rail, as a result whereof a further protection of the pivot arm and, thus, of the detectors or, respectively, of the central unit derives in the position that has been assumed.

A fixed attachment of the pivot arm to the carriage and a possibility for pivoting the pivot arm with reference to the carriage that can be realized in a simple way when needed is enabled when the pivot arm is connected to the carriage with a swivel pin and a swivel boat, whereby the swivel boat can be withdrawn from its position that connects the pivot arm and the carriage and the pivot arm can then be pivoted around the pivot boat with reference to the carriage.

A firm attachment of the carriage and, thus, of the detectors or, respectively, of the central unit of the vehicle detector arrangement in a position lowered optimally far from the bridge structure and wherein the accessibility to the central unit or, respectfully, the detectors is considerably reduced is achieved when the carrying rail comprises an end stop for the carriage and a blocking means in its lower end region with which the carriage can be blocked at the lower end stop.

The longer the pivot arm is compared to the fastening arms, the central unit or, respectively, the detectors of the vehicle detector arrangement can be offset from the edge of the bridge structure toward the center thereof all the farther given required mounting, repair and/or maintenance jobs.

In order to prevent the frame from failing onto the roadway surface given damage to the side rail at the location at which the frame is provided, it is advantageous when each frame comprises a crash protection that is secured on the one hand, to the frame and, on the other hand, to at least one side rail post that is arranged between a lower string piece of the side rail and the bridge structure.

BRIEF DESCRIPTION OF THE DRAWINGS

The invention is explained in greater detail below with reference to exemplary embodiments on the basis of the drawings.

FIG. 4 is an overhead view of two detectors attached to street-side poles with which the outer lanes of four-lane roadway can be monitored;

FIG. 5 is a side view of a central unit that is in turn arranged at a frame attached to a side rail of a bridge structure;

FIG. 6 is a side view corresponding to FIG. 5 wherein a detector is provided instead of the central unit;

FIG. 7 is a side view roughly corresponding to FIG. 5 with further details of the frame shown;

FIG. 8 is a top view of the central unit plus frame shown in FIG. 7;

FIG. 11 and FIG. 12 are side elevational views of two further alternative arrangements of vehicle detectors;

DETAILED DESCRIPTION OF THE PREFERRED EMBODIMENTS

Figure 1:
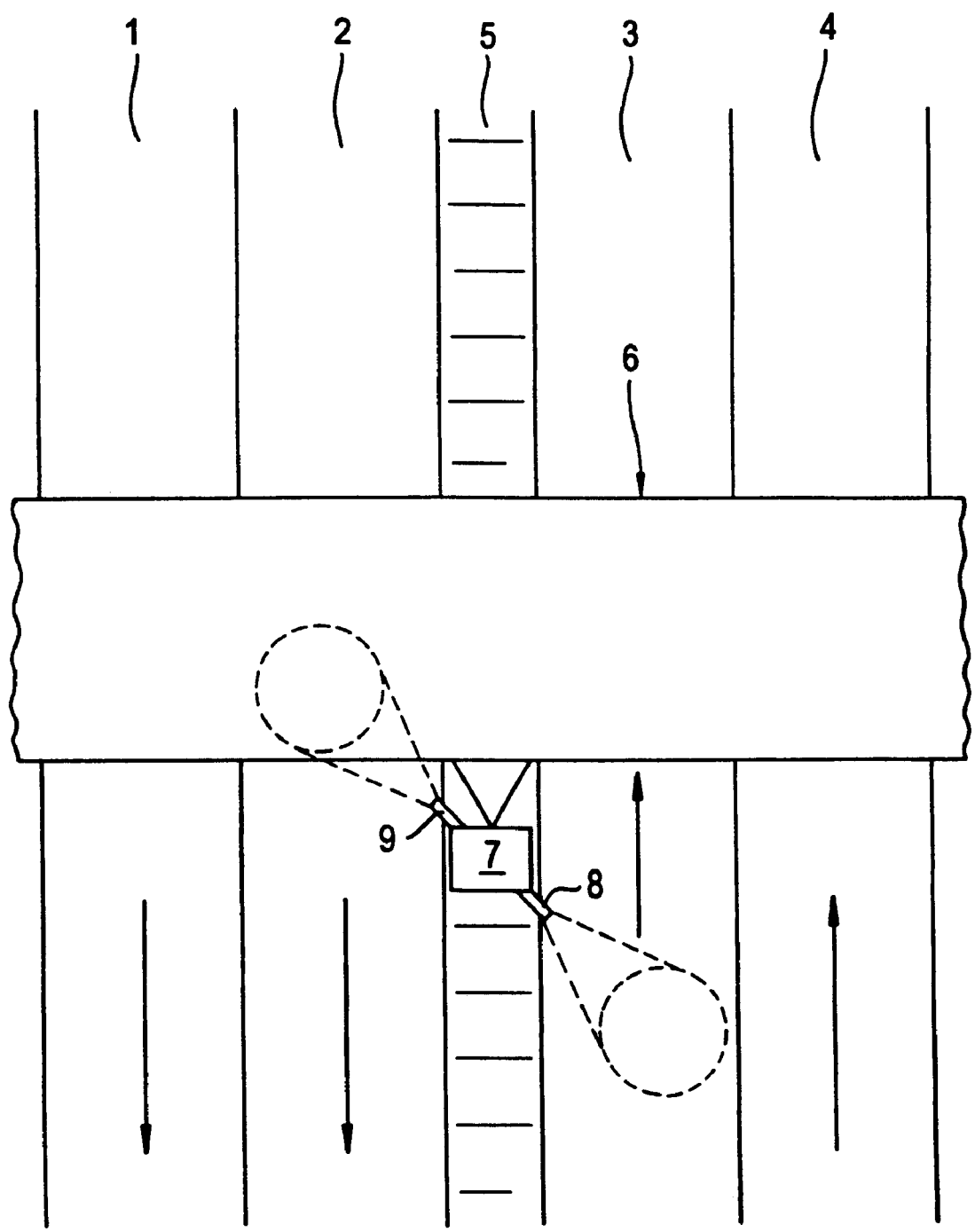
FIG. 1 is an overhead view of a detector unit of an inventive vehicle detector arrangement having two detectors at a bridge structure provided for the two middle lanes.

A roadway surface illustrated in FIG. 1 is a freeway having two lanes 1, 2, 3, 4 in each direction and a median strip 5. The four lanes 1 through 4 as well as the median strip 5 are crossed by a bridge structure 6. A detector unit 7 with two detectors 8, 9 is attached to the bridge structure 6 above the median 5. Lane 3 is monitored with the detector 8 and lane 2 is monitored with the detector 9. All traffic movement acquired on lanes 2 and 3 is forwarded to a central unit (not shown in FIG. 1), is processed thereat and forwarded to a traffic routing location or the like via a transmission/reception unit, for example a radio modem. The transmission ensues, for example, via the SMS (short message service) band of a mobile radio telephone network. The central unit as well as further detectors or detector units are similarly attached to the bridge structure and arranged, whereby further detectors cover the further lanes 1 and 4.

Figure 2:
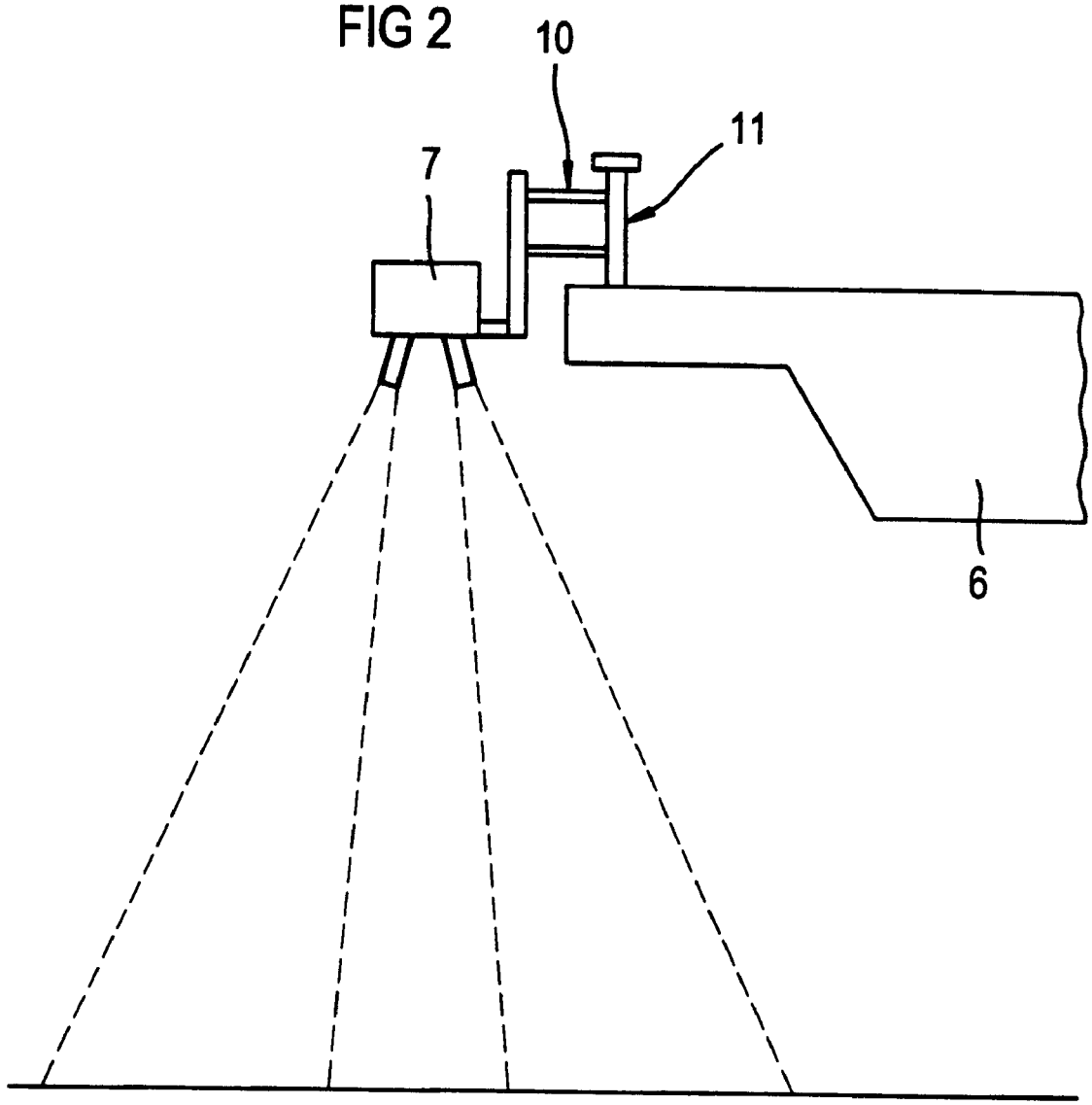
FIG. 2 is a side view of the detector unit shown in FIG. 1.

FIG. 2 shows a frame 10 with which the detector unit 7 is attached to a side rail 11 of the bridge structure 6. The frame 10 is described in greater detail later hereinafter.

Figure 3:
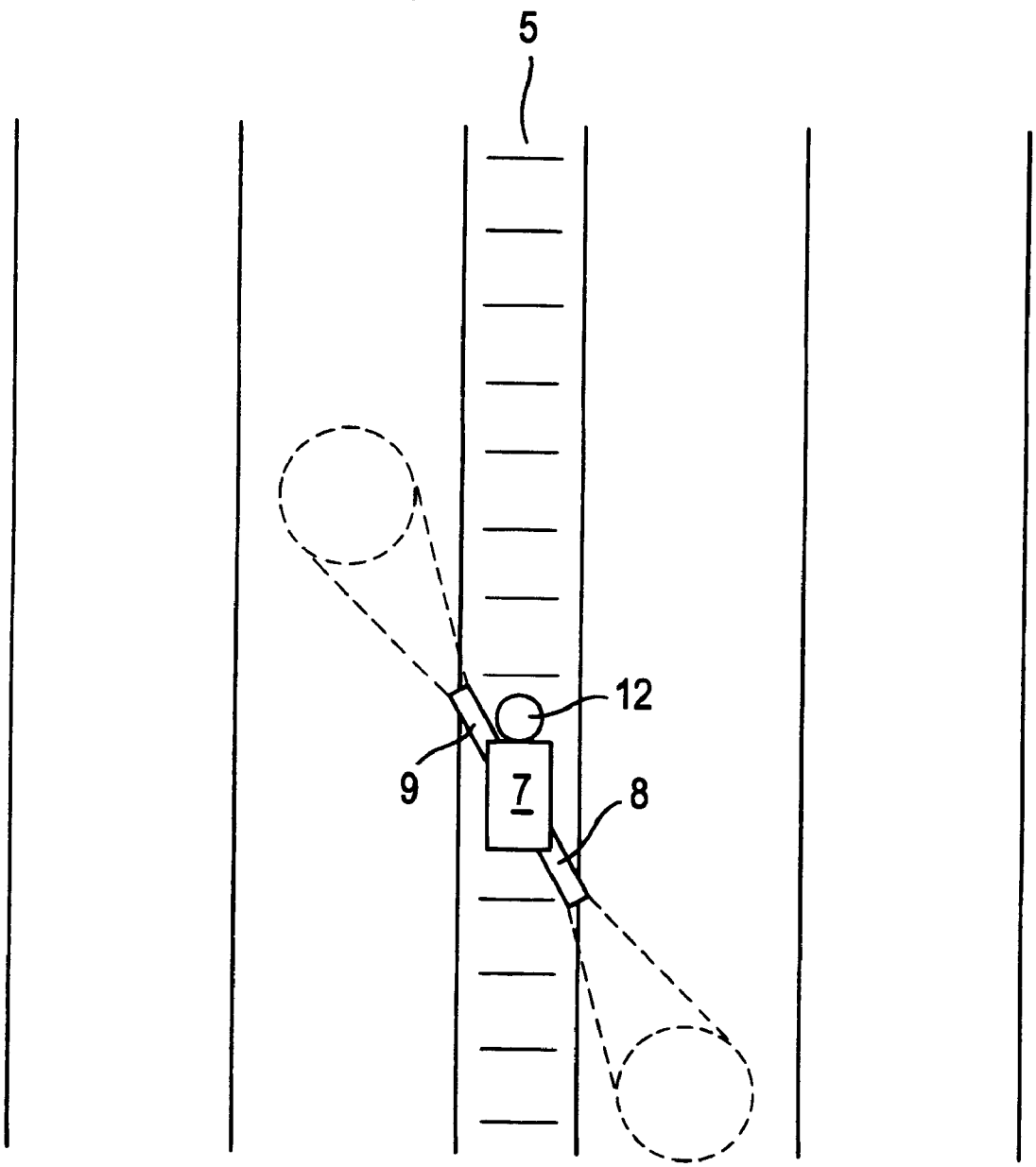
FIG. 3 is an overhead view of a detector unit with two detectors attached to a pole, these being provided for monitoring the two middle lanes of a roadway.

FIG. 3 shows an arrangement essentially corresponding to FIG. 1, whereby, however, the detector unit 7 together with the detectors 8 and 9 is attached to a pole 12 that is erected on the median 5 of the freeway.

As proceeds, for example, from FIG. 4, further poles 13 and 14 can be erected to the side of the freeway, further detectors 15 and 16 being attached thereto with which the traffic movement on the outer lanes 1 and 4 of the freeway can be covered.

All four lanes 1 through 4 of the freeway can be reliably monitored in view of the traffic movement occurring on them as the result of a combination of the detectors 8 and 9 provided in FIG. 3 and the detectors 15 and 16 provided in FIG. 4. Given a freeway that comprises further lanes, an exact acquisition can be implemented by a corresponding attachment of further detectors, whereby one lane of the freeway is to be allocated to each detector. Given the arrangement of, for example, a plurality of detectors at a pole arranged at the side of the freeway, care should be exercised to see that no occlusion effects occur for the individual detectors. In the same as shown with reference to FIGS. 1 through 4, feeder roads to freeways or similar road systems can also be monitored.

The frame 10 shown in FIG. 5 shows the purpose of mounting a central unit 17 of the inventive vehicle detector arrangement above a roadway surface (not shown in FIG. 5) located under the bridge structure 6. The mounting of the central unit 17 is fashioned such that the central unit 17 is arranged above the roadway surface next to the bridge structure 6.

Figure 10:
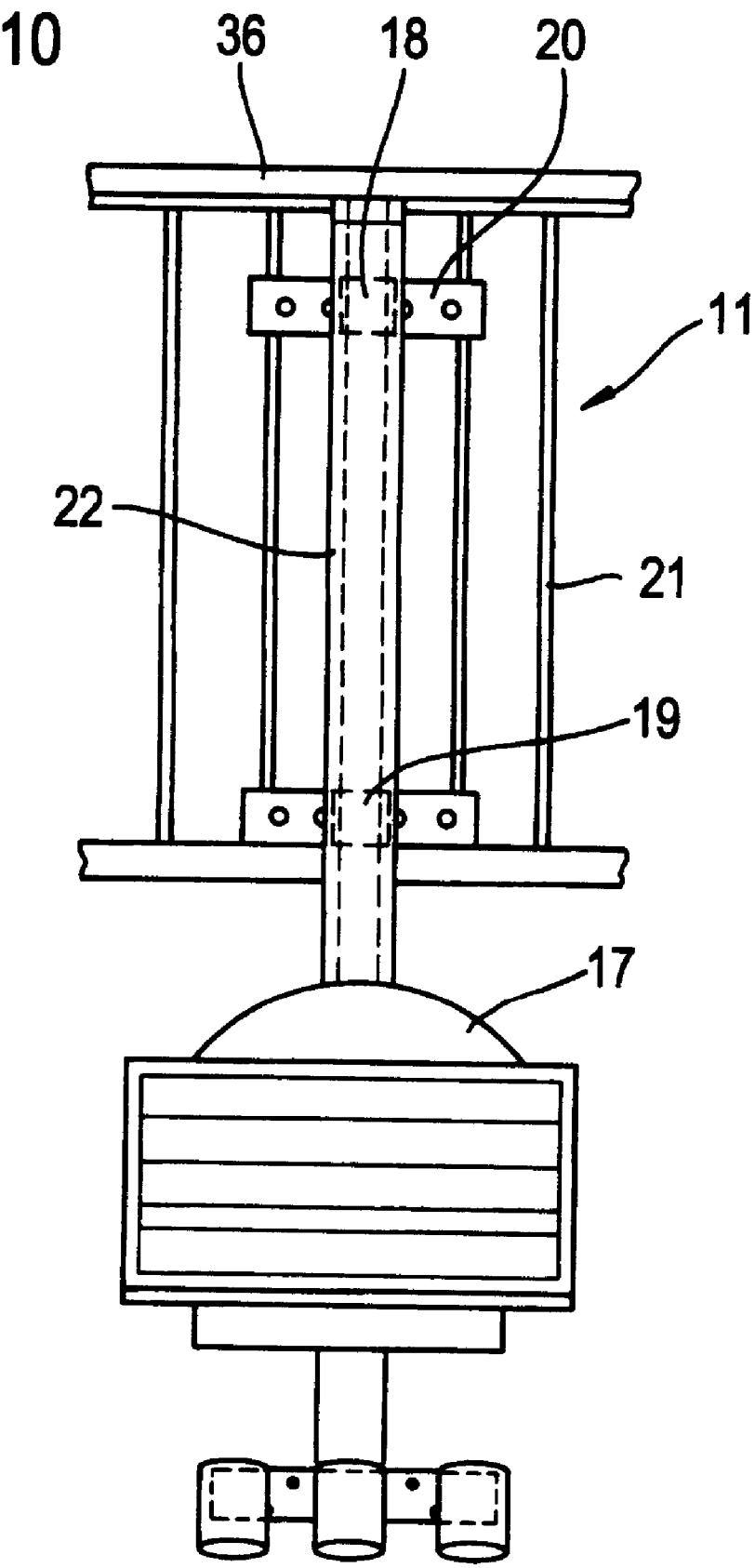
FIG. 10 is a front view of the central unit seated at the frame shown in FIGS. 7 and 8.

The frame 10 has two fastening arms 18 and 19 arranged above one another spaced in a vertical direction that proceed horizontally and parallel relative to one another. The fastening arms 18 and 19 have their one end firmly connected to respectively three web members 21 of the side rail 11 with retainer clips 20, as particularly derives from FIG. 10. A force-actuated connection between the fastening arms 18 and 19 and the web members 21 of the side rail 11 is created with the retainer clips 20, whereby damage to the side rail 11 does not occur.

A vertically extending carrying rail 22 that extends parallel to the web members 21 of the side rail 11 at the outside thereof from the upper side rail edge to a point below the cap of the bridge structure 6 are attached to the ends of the fastening arms 18 and 19 remote from the side rail.

A carriage 23 is seated at the carrying rail 22 so as to be displaceable in a vertical direction, a swivel arm 24 extending from this carriage 23 in the direction opposite the side rail 11, the central unit 17 being attached to the end thereof remote from the carriage.

The swivel arm 24 is connected to the carriage 23 with a pivot bolt 25 and a removable plug pin 26. When, in addition to the pivot bolt 25, the plug bolt 26 also engages through receptacles at the carriage side and of the side of the swivel arm, the swivel arm 24 is attached fixed to the carriage 23. A pivot of the swivel arm 24 with reference to the carriage 23 is then not possible. When the plug pin 26 is removed from the receptacles at the carriage side and at the side of the swivel arm, the swivel arm 24 can be pivoted around the pivot bolt 25 with reference to the carriage 23.

The central unit 17 attached to the end of the swivel arm 24 which is remote from the carriage is arranged in a cylindrical steel container 27 that has its upper end closed with a plastic dome 28. An antenna 28' (as shown in FIG. 7) of the central unit 17 that is required for forwarding data is arranged in the region of the plastic dome 28 in order to enable a transmission of data without deterioration.

The central unit 17 is provided with a solar panel 29 with which solar energy can be converted into the electrical energy required for the energy supply of the central unit 17.

FIG. 6 shows a frame 10 corresponding to that in FIG. 5 at which a detector 30 is mounted instead of the central unit 17. With respect to the structure and the function, the frame 10 shown in FIG. 6 corresponds to that in FIG. 5.

Figure 9:
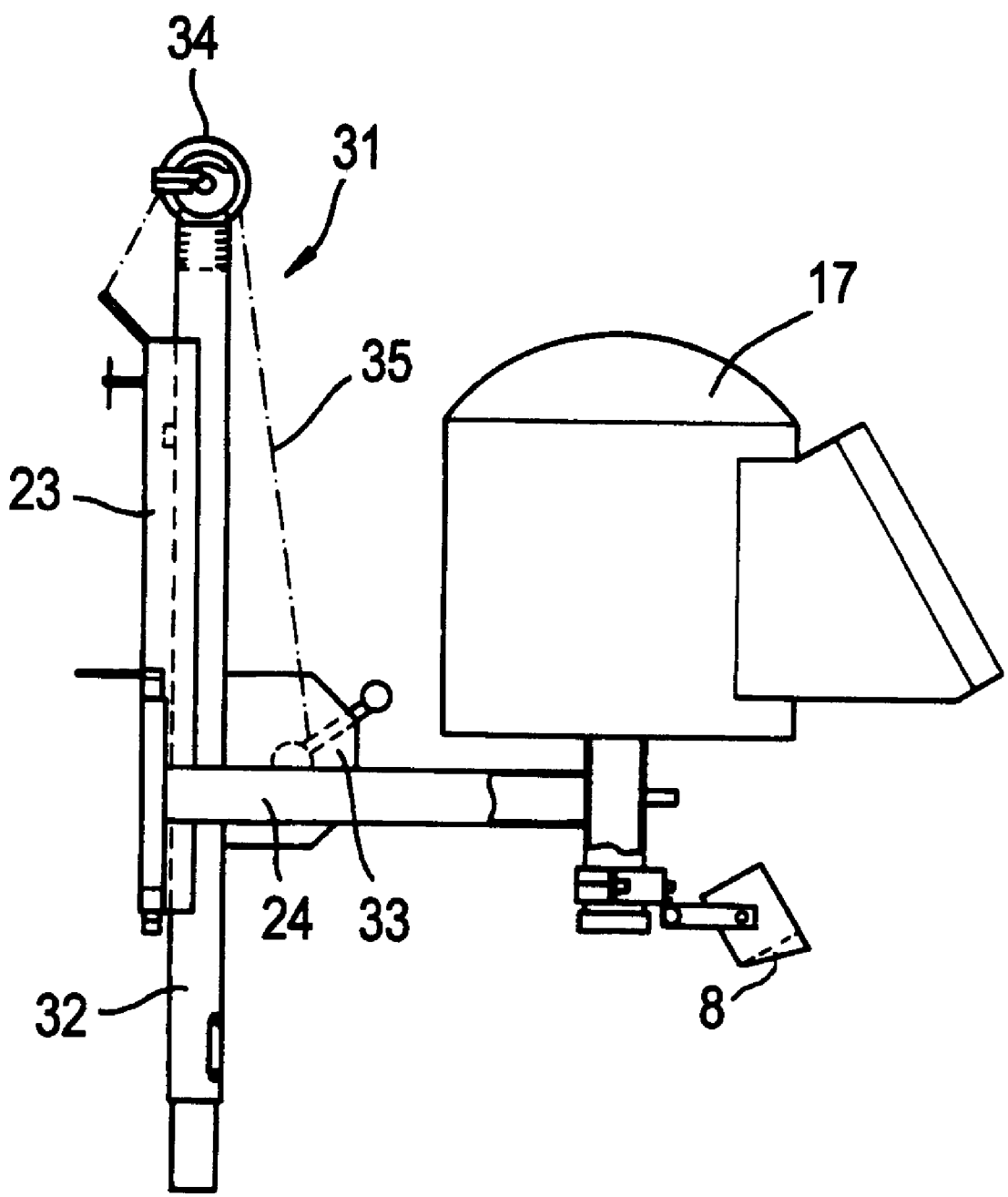
FIG. 9 a side view of a lifting mechanism being employed to lift the present detector.

For mounting, maintenance and repair jobs at the central unit 17 or, respectively, at the detector 30 or, potentially, at component parts of the frame 10 as well, a lifting mechanism shown in FIG. 9 is provided. The lifting mechanism 31 includes a stop pipe 32 that can be inserted from above into the carrying rail 22 of the frame 10. Further, the lifting mechanism 31 has a cable winch 33 with which a cable 35 running around a cable roller 34 at the upper end of the stop pipe 32 can be wound up.

When the stop pipe 32 is plugged onto the carrying route 22, the carriage 23 attached to the cable 35 can be lifted until the swivel arm 24 is located above an upper string piece 36 of the side rail 11. By releasing the plug bolt 26, the swivel arm 24 can then be pivoted around the swivel bolt 25 out of its position arranged outside the side rail 11 into a position arranged inside of the side rail 11 above the bridge structure 6 wherein repair, mounting and maintenance jobs can be implemented hazard-free.

FIGS. 11 and 12 show different arrangements of detector units 37 and 38 for monitoring a total of four lanes 1, 2, 3 and 4 with boom poles 39, whereby a T boom pole is employed in FIG. 11. Such arrangements can cover a plurality of lanes and are also suitable for six-lane acquisitions and acquisitions that cover even more lanes.

The possibility of mounting at a great mounting height, for example upon employment of boom poles and the like is of great advantage in view of what are referred to as occlusion effects.

Figure 13:
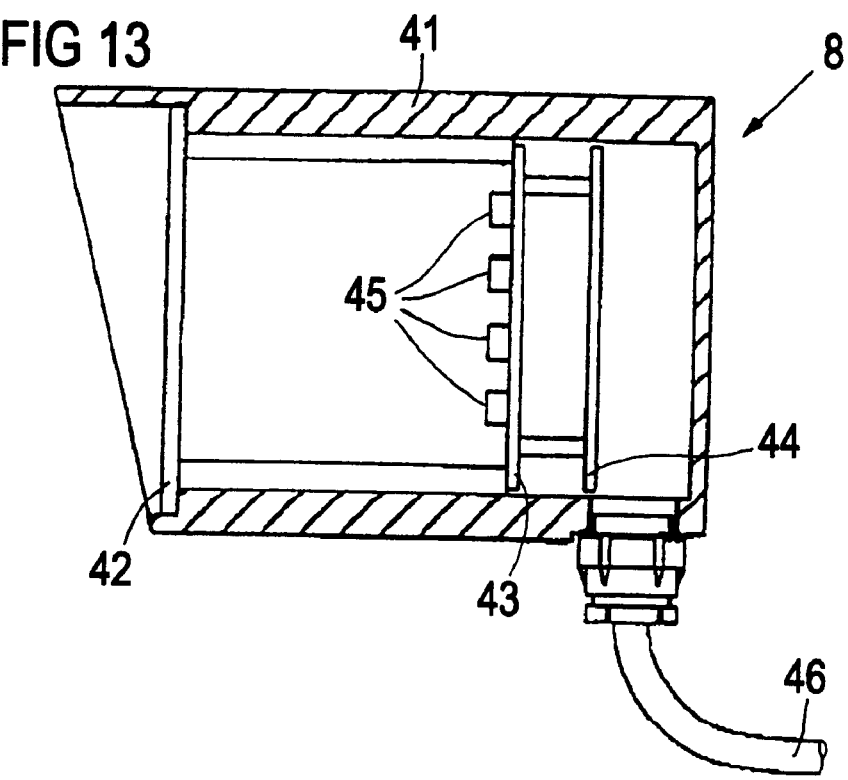
FIG. 13 is a schematic view of an exemplary embodiment of a detector unit.

An exemplary embodiment of a detector unit 8 is shown in FIG. 13, whereby this is a matter of a preferably cylindrical housing 41, for example a metal housing, that can be closed at an open side with a lens 42. For example, a plastic Fresnel lens can be arranged behind a plastic protective film. A printed circuit board 43 having, for example, the sensors and amplifiers as well as a printed circuit board 44, for example for the signal processing, evaluation and communication interface, are arranged in the inside. The sensors 45, for example, are PIR sensors. The connecting cable 46 is conducted water-tight into the housing 41. It serves the purpose of energy supply and for data exchange, so that a plurality of lines are conducted inside the cable.

Figure 14:
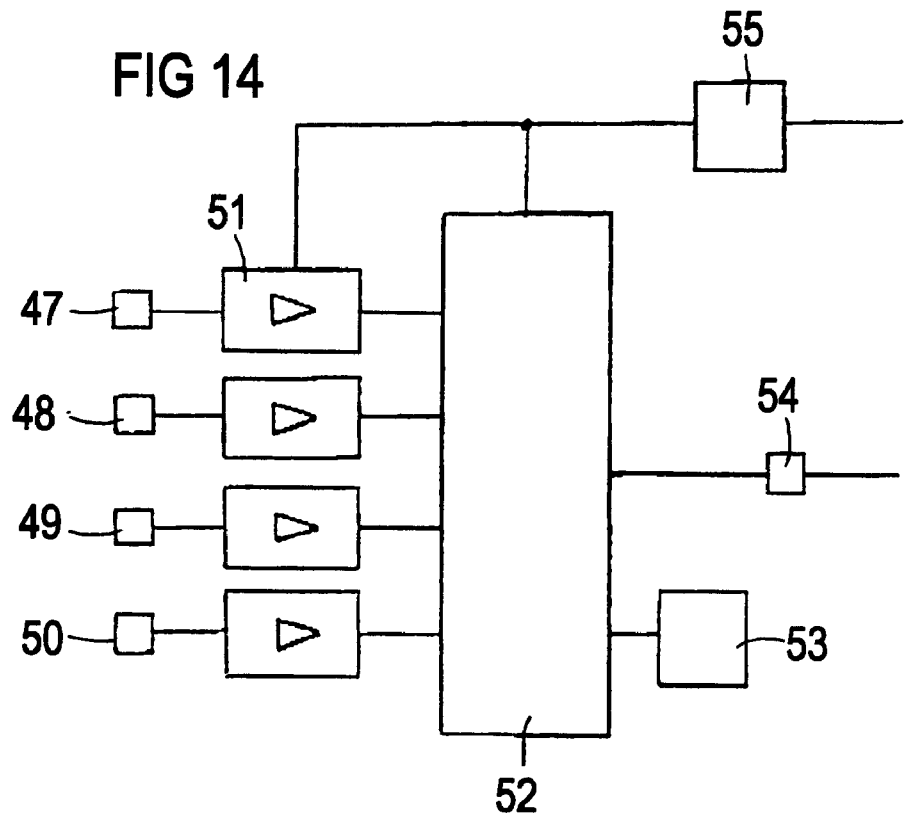
FIG. 14 is an exemplary embodiment of a schematic circuit diagram for a detector unit.
Figure 15:
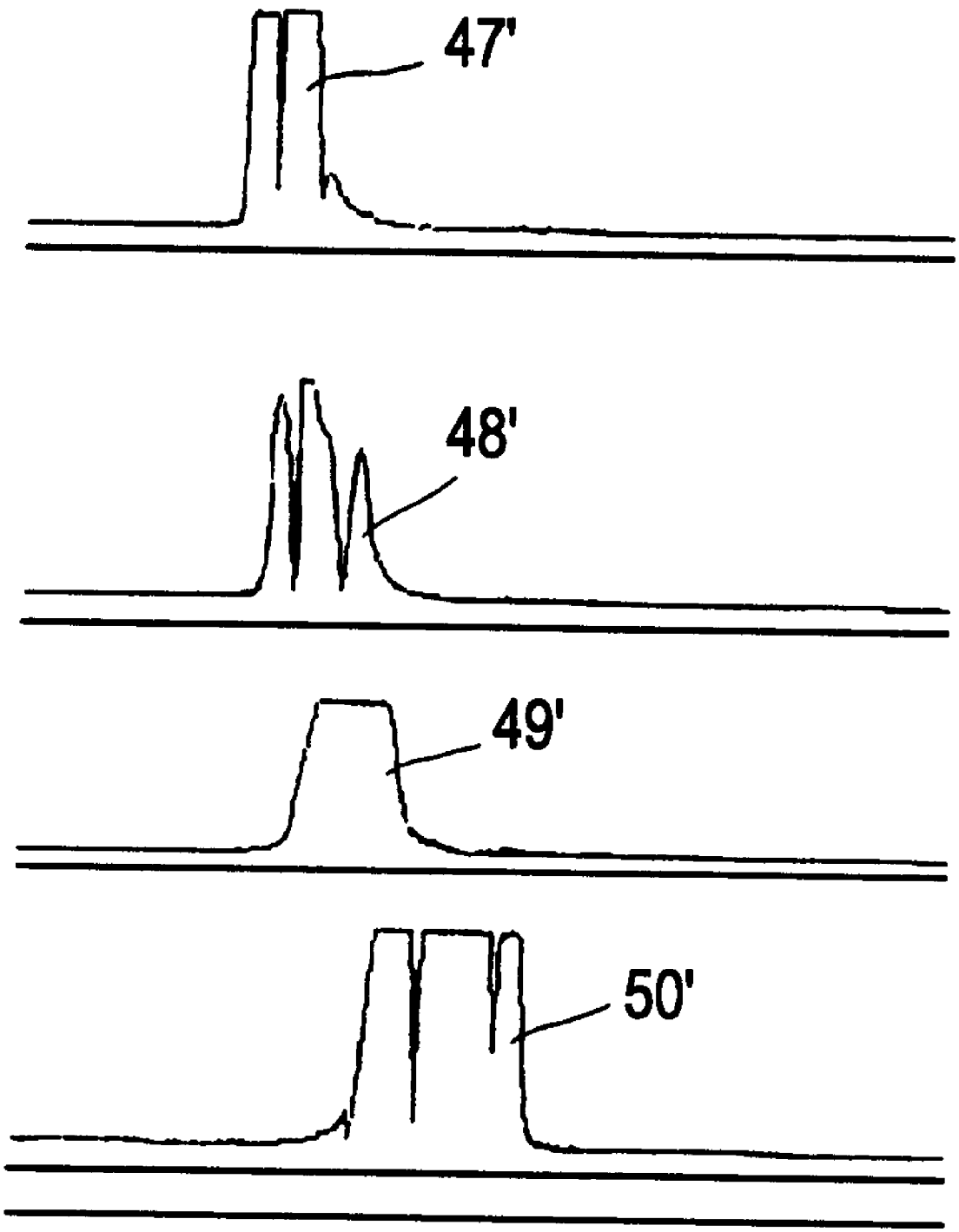
FIG. 15 is a series of signal diagrams showing the signal shapes of the sensors of the detector unit.

FIG. 14 shows an exemplary embodiment of a schematic circuit diagram for such a detector unit. In accord therewith, the passive infrared radiation (PIR) is focused through the lens 42 onto, first, sensors 47, 48 and 49 having post-pulse oscillation and, over and above this, onto a sensor 50 without post-pulse oscillation. The sensors having post-pulse oscillation comprise, for example, lithium tantalate or PVDF; the sensor without post-pulse oscillation can, for example, be a cooled photovoltaic sensor or a thermal column sensor. The output signals of these sensors are pre-processed in a control unit with the amplifier 51 and supplied to the signal processing 52. Relevant traffic data, for example in the form of speed, vehicle length, dwell time, etc., are already present at the output thereof and are offered in the memory 53. As needed, a data file can be fetched from the memory, for example via the communication interface 54 as redial modem of the transmission/reception unit. The voltage stabilizer 55 serves the purpose of a uniform energy delivery. The different signal shapes 47', 48', 49' of the sensors 47, 48, 49 having post-pulse oscillation in the illustrated exemplary embodiment 3 and the signal shape 50' of the single resonator 50 without post-pulse oscillation according to the exemplary embodiment are shown in FIG. 15.

Although other modifications and changes may be suggested by those skilled in the art, it is the intention of the inventors to embody within the patent warranted hereon all changes and modifications as reasonably and properly come within the scope of their contribution to the art.

We claim:

1. A vehicle detector arrangement, comprising:
    a detector unit including passive infrared sensors directed to provide a plurality of spatially separate sensing zones, said detector unit including sensors utilizing post-pulse oscillation and sensors without post-pulse oscillation to determine vehicle speed and length;
    an energy supply unit including a solar cell module and a control unit;
    a reception unit and a transmission unit as a transmission/reception unit; and
    a housing allocated to the energy supply unit and the control unit and the transmission/reception unit to form a compact central unit that is connected to the at least one sensor.

2. A vehicle detector arrangement as claimed in claim 1, wherein said detector unit and energy supply unit are enclosed within a single housing.

3. A vehicle detector arrangement according to claim 1, wherein the detector unit has three sensors having post-pulse oscillation and one sensor without post-pulse oscillation.

4. A vehicle detector arrangement according to claim 1, wherein the detector unit includes a radar transmitter.

5. A vehicle detector arrangement according to claim 1, wherein the detector unit includes a microwave transmitter.

6. A vehicle detector arrangement according to claim 1, wherein said control unit includes means for at least partially switching between an idle mode and an active mode.

7. A vehicle detector arrangement according to claim 1, further comprising:
    a plurality of detector units that are respectively aligned or, respectively, arranged for different lanes, said plurality of detector units being connected to said central unit.

8. A vehicle detector arrangement according to claim 1, wherein said energy supply unit includes a solar cell module, a battery, a charge regulator and a voltage converter.

9. A vehicle detector arrangement according to claim 1, wherein the transmission/reception unit includes a radio modem as a communication interface.

10. A vehicle detector arrangement according to claim 1, one of the preceding claims, characterized in that the control unit, using predetermined parameters, determines a time for the transmission of information via the transmission/reception unit.

11. A vehicle detector arrangement according to claim 1, further comprising:
    additional detectors for identifying ambient data.

12. A vehicle detector arrangement according to claim 1, further comprising:
    a video camera.

13. A vehicle detector arrangement according to claim 1, further comprising:
    means for shutting off individual components of the arrangement in an idle mode.

14. A vehicle detector arrangement according to claim 1, wherein said at least one detector unit includes a control that determines sequence and intensity of radiation contrasts and employs these for control of said at least one detector.

15. A vehicle detector arrangement according to claim 1, further comprising:
    means for self-monitoring and given the presence of malfunctions outputting messages to the control unit.

16. A vehicle detector arrangement according to claim 1, further comprising:
    a cylindrical metal container in which is located said central unit; and
    a plastic dome closing one side of said cylindrical metal container.

17. A vehicle detector arrangement according to claim 16, wherein the plastic dome is formed of one of polyamide and polyester.

18. A vehicle detector arrangement according to claim 16, further comprising:
    an antenna in the plastic dome.

19. A vehicle detector arrangement according to claim 1, further comprising:
    a frame supporting at least one of said detector unit and said central unit and attached to a side rail of a bridge structure.

20. A vehicle detector arrangement according to claim 19, wherein said frame includes a pivotable section that can be pivoted from a position arranged outside of the side rail into a position arranged above the bridge structure.

21. A vehicle detector arrangement according to claim 19, wherein said frame includes two horizontal fastening arms projecting outside of the side rail that each have one end firmly connected to the side rail.

22. A vehicle detector arrangement according to claim 21, wherein said frame includes a vertical carrying rail that is secured to ends of the two horizontal fastening arms remote from the side rail.

23. A vehicle detector arrangement according to claim 22, wherein said frame includes a carriage that is displaceable in a vertical direction at the carrying rail.

24. A vehicle detector arrangement according to claim 23, wherein said carriage includes a pivotable section fashioned as a swivel arm that has one end pivotable and fixedly seated at the carriage and that carries at least one of said at least one detector and the central unit at its other end.

25. A vehicle detector arrangement according to claim 24, wherein said frame includes a vertical carrying rail, and further comprising:
    a lifting mechanism on the vertical carrying rail, said lifting mechanism including a cable winch whose cable is connected to the carriage and with which the carriage can be vertically moved until the swivel arm of the frame is arranged above an upper string piece of the side rail.

26. A vehicle detector arrangement according to claim 1, wherein said energy supply unit has a capacity sufficient to operate the control unit over thirty days without a recharging of the energy supply unit.

27. A vehicle detector arrangement according to claim 1, wherein said detector unit is arranged such that its measuring direction comprises an angle between 0° and 90° relative to a lane of a roadway.

28. A vehicle detector arrangement according to claim 1, wherein said control unit includes means for determining a temporally stable measured value sequence and for transmitting speeds after said temporally stable measured value sequence has been determined.

29. A vehicle detector arrangement according to claim 1, wherein the detector unit includes a radar receiver.

30. A vehicle detector arrangement according to claim 1, wherein the detector unit includes a microwave receiver.

31. A vehicle detector arrangement according to claim 11, wherein said additional detectors identify ambient data selected from the group consisting of temperature, humidity and gas concentration.

* * * * *